United States Patent
Bielich et al.

(10) Patent No.: US 9,356,602 B1
(45) Date of Patent: May 31, 2016

(54) MANAGEMENT OF MEMORY RESOURCES IN A PROGRAMMABLE INTEGRATED CIRCUIT

(71) Applicant: Xilinx, Inc., San Jose, CA (US)

(72) Inventors: Luis E. Bielich, Westminster, CO (US); Robert E. Nertney, Los Gatos, CA (US)

(73) Assignee: XILINX, INC., San Jose, CA (US)

(*) Notice: Subject to any disclaimer, the term of this patent is extended or adjusted under 35 U.S.C. 154(b) by 0 days.

(21) Appl. No.: 14/712,744

(22) Filed: May 14, 2015

(51) Int. Cl.
*H03K 19/177* (2006.01)
*G06F 12/00* (2006.01)
*H03K 19/00* (2006.01)
*G06F 12/08* (2016.01)
*G06F 13/16* (2006.01)
*G06F 9/50* (2006.01)
*G06F 11/10* (2006.01)
*G06F 21/79* (2013.01)

(52) U.S. Cl.
CPC .......... *H03K 19/1776* (2013.01); *G06F 9/5016* (2013.01); *G06F 11/1064* (2013.01); *G06F 12/0897* (2013.01); *G06F 13/1694* (2013.01); *G06F 21/79* (2013.01); *H03K 19/0008* (2013.01); *G06F 2212/6042* (2013.01)

(58) Field of Classification Search
CPC ........... H03K 19/1776; H03K 19/0008; G06F 12/0897; G06F 2212/206; G06F 13/1694; G06F 2212/205; G06F 9/5016; G06F 11/1064; G06F 21/78; G06F 21/79; G06F 12/00; G06F 12/084; G06F 2212/251; G06F 2212/601; G06F 2212/657; G06F 3/0644; Y02B 60/32
See application file for complete search history.

(56) References Cited

U.S. PATENT DOCUMENTS

| | | | | |
|---|---|---|---|---|
| 6,129,458 A * | 10/2000 | Waters | .................. | G06F 8/4442 711/133 |
| 6,708,253 B2 * | 3/2004 | Hertwig | .................. | G06F 12/08 711/103 |
| 7,500,060 B1 * | 3/2009 | Anderson | ................ | G06F 7/785 711/132 |
| 8,495,299 B2 * | 7/2013 | Fuller | .................. | G06F 12/0802 711/118 |
| 8,694,755 B1 * | 4/2014 | Aingaran | ................. | G06F 12/10 711/201 |
| 8,930,647 B1 * | 1/2015 | Smith | .................. | G06F 9/44557 711/103 |
| 9,146,879 B1 * | 9/2015 | Aingaran | ................ | G06F 12/10 |
| 9,195,592 B1 * | 11/2015 | Weingarten | ......... | G06F 12/0246 |

OTHER PUBLICATIONS

Xilinx, Inc., Xilinx Wiki, "Zynq-7000AP SoC Boot-Booting and Running Without External Memory Tech Tip", 17 pages, accessed on May 14, 2015, San Jose, CA USA, website http://www.wiki.xilinx.com/Zyng-7000+AP+SoC+Boot+-+Booting+and+Running+Without+External+Memory+Tech+Tip.

* cited by examiner

*Primary Examiner* — Vibol Tan
(74) *Attorney, Agent, or Firm* — LeRoy D. Maunu

(57) ABSTRACT

An approach for management of memory in a programmable integrated circuit (IC) includes configuring a memory map of the programmable IC with an association of a first subset of addresses of memory address space of the programmable IC and physical memory of the programmable IC. The memory map is further configured with an association of a second subset of addresses of the memory address space and a virtual memory block. At least a portion of a cache memory of the programmable IC is locked to the second subset of addresses.

20 Claims, 4 Drawing Sheets

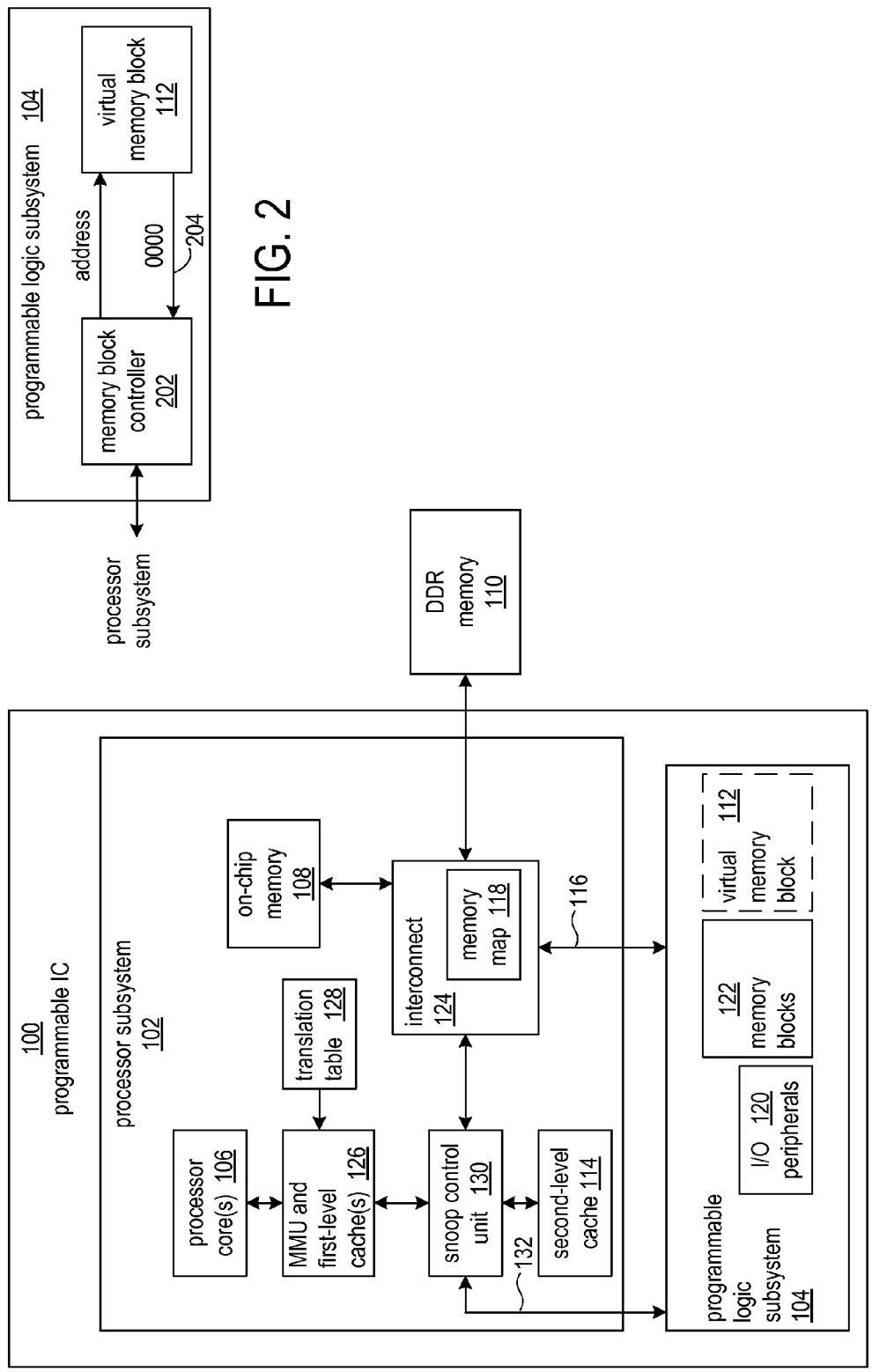

translation table 400

| physical address | Other attributes | Cacheable bit |
|---|---|---|
| physical address | | NC |
| physical address | | NC |
| physical address | | NC |
| ... | | |
| physical address | | NC |
| physical address (virtual memory block) | | C |
| physical address (virtual memory block) | | C |
| ... | | |
| physical address (virtual memory block) | | C |
| physical address | | NC |
| physical address | | NC |
| physical address | | NC |
| ... | | |
| physical address | | NC |

404 refers to rows with NC; 402 refers to rows with C.

FIG. 4 system memory map 300

| address range | |
|---|---|
| address range | on-chip memory |
| address range | reserved |
| address range | CPU private registers |
| address range | processor system registers |
| address range | reserved |
| address range | I/O peripherals |
| address range 304 | programmable logic {virtual memory block 302} |
| address range | DDR |
| address range | on-chip memory |

FIG. 3

MANAGEMENT OF MEMORY RESOURCES IN A PROGRAMMABLE INTEGRATED CIRCUIT

FIELD OF THE INVENTION

The disclosure generally relates to managing memory resources in a programmable integrated circuit (IC).

BACKGROUND

Programmable integrated circuits (ICs) with different capabilities are widely available. Generally, programmable ICs are devices that can be programmed to perform specified logic functions. A programmable IC may include programmable logic or a combination of programmable logic and hardwired logic, such as one or more microprocessors. One type of programmable IC, the field programmable gate array (FPGA), typically includes an array of programmable tiles. These programmable tiles comprise various types of logic blocks, which can include, for example, input/output blocks (IOBs), configurable logic blocks (CLBs), dedicated random access memory blocks (BRAM), multipliers, digital signal processing blocks (DSPs), processors, clock managers, delay lock loops (DLLs), bus or network interfaces such as Peripheral Component Interconnect Express (PCIe) and Ethernet and so forth.

Each programmable tile may include both programmable interconnect and programmable logic. The programmable interconnect typically includes a large number of interconnect lines of varying lengths interconnected by programmable interconnect points (PIPs). The programmable logic implements the logic of a user design using programmable elements that can include, for example, function generators, registers, arithmetic logic, and so forth.

The programmable interconnect and programmable logic are typically programmed by loading a configuration data stream into internal configuration memory cells that define how the programmable elements are configured. The configuration data can be read from memory (e.g., from an external PROM) or written into the FPGA by an external device. The collective states of the individual memory cells then determine the function of the FPGA.

Some programmable ICs include one or more microprocessors that are capable of executing program code. The microprocessor can be fabricated as part of the same die that includes the programmable logic circuitry and the programmable interconnect circuitry, also referred to collectively as the "programmable circuitry" of the IC. It should be appreciated that execution of program code within a microprocessor is distinguishable from "programming" or "configuring" the programmable circuitry that may be available on an IC. The act of programming or configuring programmable circuitry of an IC results in the implementation of different physical circuitry as specified by the configuration data within the programmable circuitry.

A system on chip (SOC) is an example of a programmable IC. An SOC may include a micro-processor, programmable logic, on-chip memory, various input/output (I/O) circuitry, and interconnect circuits for communicating between the micro-processor, programmable logic, and I/O circuitry.

Although the integration of multiple functions on a single SOC may support a wide variety of applications and provide great flexibility, the quantity of resources providing particular functional circuitry on the SOC may be less than the quantity of resources available if that particular functional circuitry were implemented on a separate IC die. For example, an SOC may have fewer programmable logic resources than a dedicated FPGA IC die. Similarly, an SOC having one or more microprocessors, on-chip memory, and programmable logic, may have fewer on-chip memory resources than another SOC having microprocessors, on-chip memory, and no programmable logic. Some applications may benefit from a greater quantity of on-chip memory than a particular SOC has available. To accommodate a need for more on-chip memory, a designer may look for an SOC having greater on-chip memory resources. However, an SOC having more on-chip memory may be more expensive than another SOC having less on-chip memory, leaving the designer to choose between less performance at a reduced cost or greater performance at a greater cost.

SUMMARY

A method of managing memory in a programmable integrated circuit (IC), is disclosed. The method includes configuring a memory map of the programmable IC with an association of a first subset of addresses of memory address space of the programmable IC to physical memory of the programmable IC. The memory map is configured with an association of a second subset of addresses of the memory address space to a virtual memory block. At least a portion of a cache memory of the programmable IC is locked to the second subset of addresses.

A programmable IC is also disclosed. The programmable IC includes a processor subsystem, and the processor subsystem includes memory circuitry that implements a first portion of memory address space of the programmable IC. The programmable IC further includes a programmable logic subsystem, and the programmable logic subsystem includes programmable logic circuitry and memory circuitry that implement a second portion of the memory address space. A cache circuit is coupled to the memory circuitry of the processor subsystem and to the memory circuitry of the programmable logic subsystem. A virtual memory block circuit is implemented in the programmable logic circuitry. The virtual memory block circuit is responsive to addresses of a subset of the second portion of the memory address space. The cache circuit includes lock storage elements and tag storage elements associated with storage blocks of the cache circuit. A plurality of the tag storage elements are configured with addresses of the subset of the second portion of the memory address space. One or more of the lock storage elements are configured with a first value that indicates that one or more of the associated storage blocks are locked to the addresses of the subset of the second portion of the memory address space in the plurality of tag storage elements.

Other features will be recognized from consideration of the Detailed Description and Claims, which follow.

BRIEF DESCRIPTION OF THE DRAWINGS

Various aspects and features of the disclosed methods and circuits will become apparent upon review of the following detailed description and upon reference to the drawings in which:

FIG. 1 shows a programmable IC, which is an example of a system on chip (SOC);

FIG. 2 shows an example of an implementation of a virtual memory block in a programmable logic subsystem;

FIG. 3 shows a system memory map that may be applicable to the system of FIG. 1;

FIG. 4 illustrates a translation table that maps physical addresses to attributes of those physical addresses;

DETAILED DESCRIPTION OF THE DRAWINGS

Figure 5:
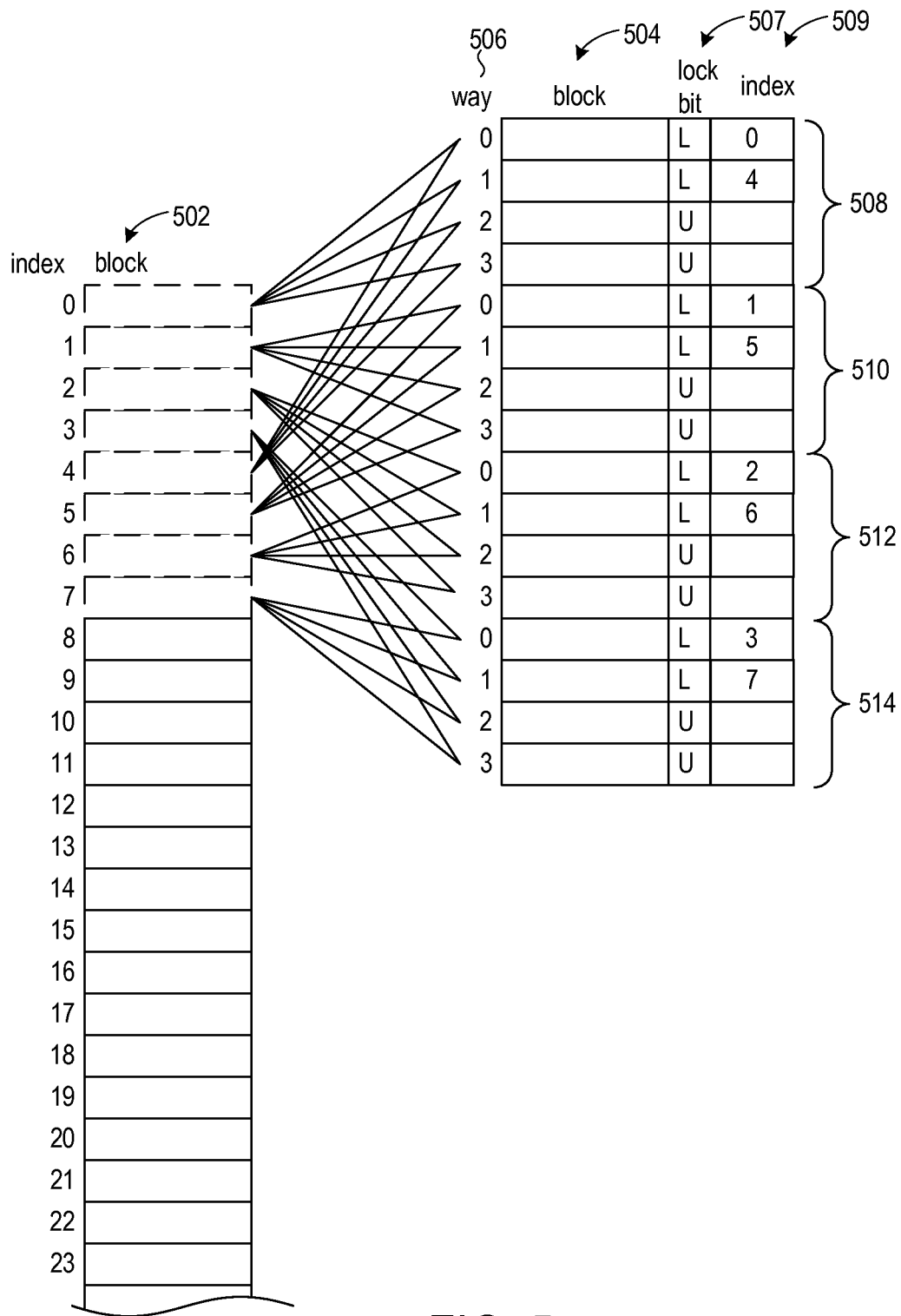
FIG. 5 shows multiple blocks of memory and a cache memory having locked addresses for a virtual memory block.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

In the disclosed methods and systems, the quantity of on-chip memory of a programmable IC, such as an SOC, is increased by implementing a virtual memory block and dedicating cache storage of the programmable IC to the part of the address space of the programmable IC assigned to the virtual memory block.

The programmable IC includes a memory map that describes the address space of the programmable IC. The memory map is configured such that part of the address space is associated with physical memory resources that provide data storage on the programmable IC. A virtual memory block is associated with another part of the address space. The virtual memory block is assigned a subset of addresses of the address space, and there is no main memory circuitry for storage of data at those addresses. Instead of the virtual memory block having main memory circuitry, a cache is locked with the addresses associated with the virtual memory block. Caching of data at addresses outside the virtual memory block addresses may be disabled if the entire cache is used for the virtual block. When the addresses of the virtual memory block are locked in the cache, references to the addresses of the virtual memory block are resolved to the cache. Any updates to data at the addresses of the virtual memory block remain in the cache and are not further written to any main memory storage, because the storage for the addresses of the virtual memory block is provided exclusively by the cache.

FIG. 1 shows a programmable IC 100, which is an example of an SOC. The programmable IC may be configured to effectively increase the quantity of on-chip memory on the chip. The programmable IC includes a processor subsystem 102 and a programmable logic subsystem 104. The processor subsystem generally includes one or more processor cores 106, memory resources, and circuitry for connecting to the programmable logic subsystem. The programmable logic subsystem may include programmable logic (not shown), programmable interconnect (not shown) and various other circuitry such as that described above for an FPGA.

The programmable IC includes a number of memory resources that are accessible to program code executing on the processor core 106 or to a circuit implemented in the programmable logic subsystem. The memory resources include on-chip memory 108 and memory blocks 122 that may be configured in the programmable logic subsystem. Double data rate (DDR) memory resources 110 may be disposed off-chip and provide additional storage for program code executing on the processor core or for circuits implemented in the programmable logic subsystem. The on-chip memory 108 and DDR memory 110 may be implemented with DRAM in an example implementation.

The physical address space of the programmable IC is mapped in memory map 118. The physical address space encompasses the on-chip memory 108 and DDR memory 110, and in addition, address space available in the programmable logic subsystem, such as for I/O peripherals 120, memory blocks 122, and the virtual memory block 112. The memory map may be a lookup table memory in which ranges of addresses are mapped to the components assigned to the address ranges. For example, one address range is mapped to on-chip memory 108, another address range is mapped to DDR memory 110, another address range is mapped to I/O peripherals 120, and another address range is mapped to the programmable logic in which memory blocks 122 and virtual memory block 112 may be implemented. The interconnect circuit 124 uses the memory map to direct a memory access request to the correct component.

For some applications, there may be security requirements that exclude some uses of DDR memory, a need for additional memory in the processor subsystem, or improved determinism in memory access times. The programmable IC may be configured to implement a virtual memory block 112 in the programmable logic subsystem and to lock addresses of the virtual memory block to the second-level cache 114 in the processor subsystem 102 in order to provide additional memory resources to the processor subsystem. Caching may be disabled for addresses outside the virtual memory block if the entire cache is dedicated to the virtual memory block. Program code executing on the processor core 106 can access on-chip memory 108 and second-level cache 114 faster than accessing memory implemented in the programmable logic subsystem or DDR memory 110. Although the programmable logic subsystem may be configured to implement memory resources for code executing in the processor subsystem, an access request from the processor core to memory implemented in the programmable logic subsystem may pass through a switching network, as exemplified by line 116, and incur substantial delay.

In one implementation, the virtual memory block 112 is implemented in programmable logic of the programmable logic subsystem 104. The virtual memory block 112 differs from memory blocks 122 in that there is no data storage provided by the virtual memory block in the programmable logic subsystem. That is, program code executing on processor core 106 may write data in memory circuitry in the programmable logic subsystem that implements memory blocks 122, but data written to the addresses of the virtual memory block 112 is not stored in any memory circuitry of the programmable logic subsystem. Rather, data written to the addresses of the virtual memory block is stored in the second-level cache 114.

Instead of having memory circuits in the programmable logic subsystem for storage of data for the addresses of the virtual memory block, the addresses of the virtual memory block are locked in the second-level cache 114. Accesses by code executing on the processor core(s) 106 to addresses mapped to the virtual memory block will be directed to the second-level cache. Thus, code executing on the processor core has both on-chip memory 108 and the second-level cache available as memory resources accessible within the processor subsystem. All updates to data at the addresses of the virtual memory block remain in the second-level cache and updating of main memory is bypassed, because the storage for the addresses of the virtual memory block is provided exclusively by the cache. Likewise, accesses to addresses of the virtual memory block by code executing on a "soft processor" (not shown), which is a processor implemented in programmable logic of the programmable logic subsystem, will be directed to the second-level cache.

The processor subsystem further includes a memory management unit (MMU) and first-level cache circuit 126, a translation table 128, and a snoop control unit 130. The MMU receives memory access requests from the processor core(s) 106 and uses the translation table to translate virtual addresses into physical addresses. The translation table maps a virtual address space to physical addresses of the physical memory resources of the SOC.

In an example implementation, the translation table includes flag storage elements associated with the physical addresses. The state of each flag storage element indicates whether or not the associated address range is cacheable or non-cacheable. For addresses of the virtual memory block, the associated flag storage elements in the translation table may be set to a value that indicates that caching of data at those addresses is enabled. For addresses outside the virtual memory block, the associated flag storage elements may be set to a value that indicates that caching of data at those addresses is disabled if the entire cache is dedicated to the virtual memory block.

The MMU 126 determines whether or not the address in a memory request from the processor core(s) is present in the first-level cache. For addresses present in the first-level cache, the MMU accesses the first-level cache. For addresses not present in the first-level cache, the MMU passes the requests to the snoop control unit 130.

The snoop control unit 130 processes memory access requests forwarded from the MMU and memory access requests transmitted by processor circuits (not shown) implemented in the programmable logic subsystem 104 over interface 132. In addition to maintaining coherency between second-level cache 114 and other caches (not shown) in the programmable logic subsystem, the snoop control unit determines whether or not a requested address is cached in the second-level cache. As addresses of the virtual memory block 112 are locked in the second-level cache, the second-level cache is accessed for requests referencing the virtual memory block. For requests referencing addresses not present in the second-level cache, the snoop control unit forwards the request to the interconnect circuit 124, which in turn determines the component address from the memory map 118 and forwards the request accordingly.

The use of the virtual memory block and locking of addresses of the virtual memory block may be adapted to a variety of different programmable IC architectures. For example, in one implementation, the second-level cache is an 8-way, set associative cache. It will be recognized that the cache in alternative implementations may have fewer or more ways, may be direct mapped, or may be fully associative. The processor subsystem 102 has first-level and second-level caches. An alternative implementation may have a single level cache in which the addresses of the virtual memory block are locked in the single level cache.

FIG. 2 shows an example of an implementation of a virtual memory block 112 in a programmable logic subsystem 104. The virtual memory block may be implemented as a circuit that outputs bit values of 0 for every address input to the circuit. The virtual memory block need not have any memory circuits for storing data associated with the addresses of the address space assigned to the virtual memory block, as the same constant value is output for each assigned address, as illustrated by line 204. The programmable logic subsystem may further include a memory block controller 202 for providing an interface between the virtual memory block and a microcontroller bus that connects the programmable logic subsystem to the processor subsystem.

FIG. 3 shows a system memory map 300 that may be applicable to the system of FIG. 1. The memory map may be a lookup table memory that is addressable by addresses, or portions of the addresses, in the physical address space of the system. The address space may be divided into address ranges, with each address range mapped to a component or set of components addressed by the addresses in the associated address range.

The example system memory map includes address ranges mapped to on-chip memory, CPU private registers, processor system registers, I/O peripherals, programmable logic, and DDR memory. A portion of the address space that is mapped to programmable logic is allocated to a virtual memory block, as illustrated by block 302, which is a portion of the address range 304. The dashed line signifies that there is no physical memory circuitry in the programmable logic for storage of data at addressees of the virtual memory block. Other portions of the address range 304 may be assigned to memory blocks that have physical memory circuitry for storage of data at addresses assigned to the memory blocks.

FIG. 4 illustrates a translation table 400 that maps physical addresses of memory address space to attributes of those physical addresses. The translation table is a memory map and may be used by an operating system executing on the processor core(s) 106 of FIG. 1, for example. The translation table may be a lookup table memory that is addressable by physical addresses, or portions of the addresses.

In an example implementation, the entire cache may be dedicated to the virtual memory block, and the addresses of the virtual memory block are the only addresses that are cacheable. The translation table provides storage not only for physical addresses, but also includes flag storage elements that indicate whether the associated addresses are cacheable or non-cacheable. For example, storage elements 402 are set to a value that indicates that the addresses of the virtual memory block are cacheable, and all other storage elements, such as storage elements 404, are set to a value that indicates that other addresses are un-cacheable.

In addition to the storage elements that indicate whether or not the associated addresses are cacheable, the translation table may include other attributes that indicate, for example, bufferability, secure/non-secure memory, sharability, strongly-ordered/normal memory, cache strategy (if cacheable bit set), and/or read-only/write-only.

FIG. 5 shows multiple blocks 502 of memory and a cache memory 504 having locked addresses for a virtual memory block. Block indices are used in the diagram instead of memory addresses for ease of reference. Each index value corresponds to the base address of one of the blocks. The blocks next to the indices associated with the virtual memory block are shown with dashed lines to signify that a virtual memory block is not backed by physical memory circuitry. Specifically, the indices of the virtual memory block are 0-7, and the blocks adjacent to indices 0-7 are drawn with dashed lines.

Each block, other than blocks associated with the virtual memory block, represents multiple words of addressable memory. For example, each block may represent 8, 16, 32, 64 or more words of storage. Although the example cache is a four-way set associative cache, it will be recognized that the example and teachings herein may be adapted to N-way associative caches. Each index may be cached to one of four different ways of the cache, as illustrated by the lines connecting the blocks representative of the virtual memory block to ways 506 and associated storage blocks of the cache 504.

For example, indices 0 and 4 of the virtual memory block are cacheable to ways 0, 1, 2, 3 of the first set 508 of ways.

Depending on implementation requirements, portions of the cache may be locked by cache storage block or by cache way. In the example, ways 0 and 1 are locked, as indicated by the value stored in the lock storage elements ("lock bits") 507 associated with the locked ways. The indices of the virtual memory block are stored in tag storage elements 509 of the locked ways in the cache. In set 508, ways 0 and 1 are locked as indicated by the associated lock bits, and virtual memory block indices 0 and 4 are stored in the tag storage element of ways 0 and 1; in set 510, ways 0 and 1 are locked as indicated by the associated lock bits, and virtual memory block indices 1 and 5 are stored in the tag storage element of ways 0 and 1; in set 512, ways 0 and 1 are locked as indicated by the associated lock bits, and virtual memory block indices 2 and 6 are stored in the tag storage element of ways 0 and 1; in set 514, ways 0 and 1 are locked as indicated by the associated lock bits, and virtual memory block indices 3 and 7 are stored in the tag storage element of ways 0 and 1.

Ways 2 and 3 of the cache may be unlocked as indicated by the values of the associated lock bits. Blocks other than blocks of the virtual memory block may be cached in the unlocked ways 2 and 3 of the cache 504.

Figure 6:
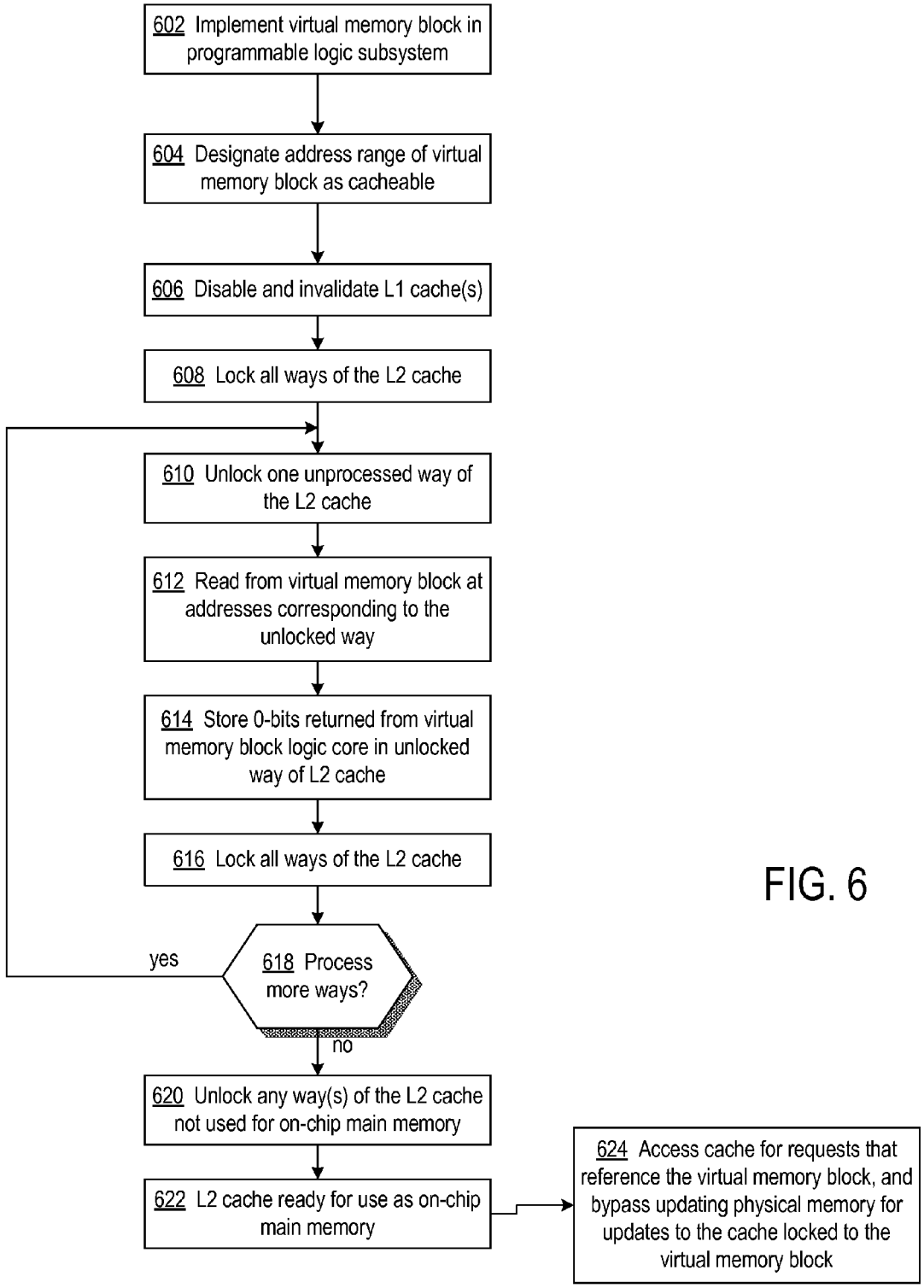
FIG. 6 shows a process of configuring a programmable IC to implement a virtual memory block and locking addresses of the virtual memory block in a cache.

FIG. 6 shows a process of configuring a programmable IC to implement a virtual memory block and locking addresses of the virtual memory block in a cache. At block 602, the virtual memory block is implemented in programmable logic resources of the programmable logic subsystem of the programmable IC. The virtual memory block may be provided to a designer as a predefined logic module, which the designer may instantiate in a circuit design, such as through a graphical user interface or a hardware description language (HDL). The designer may specify a depth or size of the virtual memory block. The logic module that defines the virtual memory block may be compiled with other portions of the design into configuration data for the programmable logic subsystem of the programmable IC. The virtual memory block is assigned to physical resources of the programmable logic subsystem by the design tool, and a hardware definition file is output to indicate the location of the virtual memory block to an operating system executing in the processor subsystem. The operating system or a user's application software may configure the translation table to indicate the portions of the memory address space that are cacheable and the portions of the memory address space that are not cacheable. For example, the subset of the address space assigned to the virtual memory block may be designated as cacheable, and other portions of the address space may be designated as non-cacheable. The configuration data that implements the virtual memory block may be loaded into the programmable logic subsystem to implement the design including the virtual memory block. As indicated above, the virtual memory block outputs a constant value, for example 0, in response to any input address in a read request. The virtual memory block need not respond to write requests, because once the cache is initialized, writes to addresses of the virtual memory block are resolved at the cache.

The processing of blocks 604-622 may be performed by program code, such as by application code of a user or an operating system, executing on the processor core 106 of FIG. 1, for example. At block 604, storage elements associated with the addresses of the virtual memory block in the translation table are set to a value that indicates the addresses are cacheable. If the entire cache is dedicated to the virtual memory block, storage elements associated with addresses other than the virtual memory block are set to a value that indicates the addresses are not cacheable. If less than the full cache is locked to the addresses of the virtual memory block, storage elements associated with addresses other than the virtual memory block may be set to the value that indicates the addresses are cacheable.

The cache is prepared for initialization and locking of the virtual memory block at blocks 606 and 608. The exemplary process is for locking the virtual memory block to a second-level cache. At block 606, the first-level cache is disabled and invalidated. The disabling of the first-level cache disables predictive caching capabilities that the first-level cache may possess. Invalidating the first-level cache ensures that any addresses of the virtual memory block that were possibly present in the first-level cache are invalidated, and read requests to the addresses of the virtual memory block are directed to the virtual memory block.

At block 608, all ways of the second-level cache are locked, and at block 610, one of the ways of the second-level cache is unlocked. In locking and unlocking ways of the cache, values of the lock bits associated with the ways, as shown in FIG. 5, are adjusted accordingly. Processing one way at a time eliminates the possibility of locking a way that may have been intended to be cacheable. Also, processing one way at a time prevents processor and compiler optimizations, such as speculative fetches and out-of-order execution, from accessing the cache. Addresses of the virtual memory block that map to the unlocked way of the cache are used in issuing read requests at block 612. Because the first-level cache was invalidated, the read requests are passed to the virtual memory block. In response to each read request, the virtual memory block responds with a constant value, such as a word of 0-value bits, and at block 614, the constant value is stored in the second-level cache. In addition, the addresses of the read requests to the virtual memory block are stored in tag memory storage elements associated with the unlocked way of the cache. It will be recognized that a block of constant values may be output by the virtual memory block and stored in the second-level cache to correspond to a block of addresses of the virtual memory block.

At block 616, all ways of the second-level cache are once again locked, and decision block 618 determines whether or not any additional ways of the cache should be processed. If the entire second-level cache is locked to the virtual memory block, then processing continues until all ways of the cache have been processed. If only a portion of the cache is needed for the virtual memory block, then processing continues until a sufficient number of ways have been processed to lock all the addresses of the virtual memory block. The process returns to block 610 for processing of another way of the cache. Otherwise, processing continues at block 620.

At block 620, any ways of the second-level cache not used for the virtual memory block are unlocked, and at block 622, the second-level cache is ready for use with all or portions locked to addresses of the virtual memory block. At block 624, in response to memory access requests that reference the virtual memory block, the portion of the cache that is locked to the virtual memory block is accessed. If the portion of the cache that is locked to the virtual memory block is updated, update of physical memory beyond the cache is bypassed, because the only storage for the virtual memory block is provided by the cache.

The methods and circuits are thought to be applicable to a variety of systems and applications. Other aspects and features will be apparent to those skilled in the art from consideration of the specification. For example, though aspects and features may in some cases be described in individual figures, it will be appreciated that features from one figure can be combined with features of another figure even though the combination is not explicitly shown or explicitly described as a combination. It is intended that the specification and drawings be considered as examples only, with a true scope of the invention being indicated by the following claims.

What is claimed is:

1. A method of managing memory in a programmable integrated circuit (IC), comprising:
   configuring a memory map of the programmable IC with an association of a first subset of addresses of memory address space of the programmable IC to physical memory of the programmable IC;
   configuring the memory map with an association of a second subset of addresses of the memory address space to a virtual memory block; and
   locking at least a portion of a cache memory of the programmable IC to the second subset of addresses.

2. The method of claim 1, further comprising implementing the virtual memory block as a circuit on the programmable IC, wherein the circuit that implements the virtual memory block returns a constant value in response to any input address in the second subset of addresses.

3. The method of claim 1, further comprising:
   accessing the locked portion of the cache memory in response to a memory access request that references an address in the second subset of addresses; and
   bypassing updating of the physical memory for updates to the locked portion of the cache memory.

4. The method of claim 1, wherein the locking includes locking one or more ways of a plurality of ways of the cache memory.

5. The method of claim 1, wherein the cache memory is a second-level cache.

6. The method of claim 1, wherein the programmable IC has a processor subsystem and a programmable logic subsystem, a second-level cache in the processor subsystem, a portion of the address space assigned to physical memory in the programmable logic subsystem, and the second subset of addresses associated with a subset of the portion of the address space assigned to physical memory in the programmable logic subsystem.

7. The method of claim 6, further comprising implementing the virtual memory block as a circuit in the programmable logic subsystem, wherein the circuit that implements the virtual memory block returns a constant value in response to any input address in the second subset of addresses.

8. The method of claim 1, further comprising storing a first value in storage elements associated with the addresses of the first subset, and storing a second value in storage elements associated with the addresses of the second subset, wherein the first value indicates that the addresses of the first subset are non-cacheable, and the second value indicates that the addresses of the second subset are cacheable.

9. The method of claim 1, wherein the locking includes:
   storing one or more addresses of the second subset in storage elements associated with one or more ways of the cache memory;
   storing a first value in one or more storage elements associated with the one or more ways of the cache memory, wherein the first value in the one or more storage elements indicates that the associated one or more ways are locked to the one or more addresses of the second subset.

10. The method of claim 1, wherein the cache memory is a multi-way set associative cache, the method further comprising:
    implementing the virtual memory block as a circuit on the programmable IC, wherein the circuit that implements the virtual memory block returns a constant value in response to any input address in the second subset of addresses;
    selecting one way of the cache memory;
    issuing read requests to the virtual memory block at addresses of the second subset of addresses and corresponding to the one way;
    storing the constant value returned from the circuit that implements the virtual memory block in memory of the selected one way of the cache memory; and
    repeating the selecting, issuing, and storing for one or more other ways of the cache memory.

11. The method of claim 10, wherein the selecting, issuing, and storing for one or more other ways of the cache memory is repeated until all the ways of the cache memory have been processed.

12. The method of claim 10, wherein the selecting, issuing, and storing for one or more other ways of the cache memory is repeated for fewer than all the ways of the cache memory.

13. The method of claim 10, further comprising implementing the virtual memory block as a circuit on the programmable IC, wherein the circuit that implements the virtual memory block returns a constant value in response to any input address in the second subset of addresses.

14. The method of claim 10, further comprising:
    accessing the locked portion of the cache memory in response to a memory access request that references an address in the second subset; and
    bypassing updating of the physical memory for updates to the locked portion of the cache memory.

15. The method of claim 10, further comprising storing a first value in storage elements associated with the addresses of the first subset, and storing a second value in storage elements associated with the addresses of the second subset, wherein the first value indicates that the addresses of the first subset are non-cacheable, and the second value indicates that the addresses of the second subset are cacheable.

16. A programmable integrated circuit (IC), comprising:
    a processor subsystem including memory circuitry that implements a first portion of memory address space of the programmable IC;
    a programmable logic subsystem including programmable logic circuitry and memory circuitry that implements a second portion of the memory address space;
    a cache circuit coupled to the memory circuitry of the processor subsystem and to the memory circuitry of the programmable logic subsystem; and
    a virtual memory block circuit implemented in the programmable logic circuitry, wherein the virtual memory block circuit is responsive to addresses of a subset of the second portion of the memory address space;
    wherein:
      the cache circuit includes lock storage elements and tag storage elements associated with storage blocks of the cache circuit,
      a plurality of the tag storage elements are configured with addresses of the subset of the second portion of the memory address space, and
      one or more of the lock storage elements are configured with a first value that indicates that one or more associated storage blocks are locked to the addresses of the subset of the second portion of the memory address space in the plurality of tag storage elements.

17. The programmable IC of claim 16, wherein:
    the processor subsystem includes flag storage elements associated with the addresses of memory address space;

a first subset of the flag storage elements are configured with a first value that indicates that caching of data from the first portion of the memory address space is disabled; and a second subset of the flag storage elements are configured with a second value that indicates that caching of data from the second portion of memory address space is enabled.

18. The programmable IC of claim 16, wherein the virtual memory block circuit is configured to return a constant value in response to any input address in the subset of the second portion of the memory address space.

19. The programmable IC of claim 16, wherein the cache circuit is configured and arranged to:

access a storage block locked to an address of the subset of the second portion of the memory address space in response to a memory access request that references the address in the subset of the second portion of the memory address space; and bypass updating of the physical memory for an update to the storage block locked to the address of the subset of the second portion of the memory address space.

20. The programmable IC of claim 16, wherein the processor subsystem includes a first-level cache coupled to the cache circuit, and the cache circuit is a second-level cache.

* * * * *